(12) United States Patent
Pul

(10) Patent No.: US 10,774,807 B2
(45) Date of Patent: Sep. 15, 2020

(54) OMNI MULTI AXES-VERTICAL AXIS WIND TURBINE (M-VAWT)

(71) Applicant: George Pul, Las Vegas, NV (US)

(72) Inventor: George Pul, Las Vegas, NV (US)

(*) Notice: Subject to any disclaimer, the term of this patent is extended or adjusted under 35 U.S.C. 154(b) by 117 days.

(21) Appl. No.: 16/055,099

(22) Filed: Aug. 5, 2018

(65) Prior Publication Data

US 2020/0040872 A1    Feb. 6, 2020

(51) Int. Cl.
*F03D 3/06* (2006.01)
*F03D 3/00* (2006.01)

(52) U.S. Cl.
CPC ............. *F03D 3/068* (2013.01); *F03D 3/005* (2013.01); *F03D 3/061* (2013.01); *F03D 3/065* (2013.01); *F05B 2220/30* (2013.01); *F05B 2220/706* (2013.01); *F05B 2240/213* (2013.01); *F05B 2260/902* (2013.01)

(58) Field of Classification Search
CPC .......... F03D 3/005; F03D 3/061; F03D 3/065; F03D 3/0067; F03D 3/068; F03D 3/02; F05B 2220/30; F05B 2220/706; F05B 2240/213; F05B 2260/902
USPC ............................................. 290/44; 416/119
See application file for complete search history.

(56) References Cited

U.S. PATENT DOCUMENTS

| | | | | |
|---|---|---|---|---|
| 4,039,849 A | * | 8/1977 | Mater ..................... | B60K 16/00 290/55 |
| 4,115,027 A | * | 9/1978 | Thomas ................ | F03D 3/0409 415/53.1 |
| 5,057,696 A | * | 10/1991 | Thomas .................... | F03D 3/02 290/44 |
| 8,257,018 B2 | * | 9/2012 | Coffey .................... | F03D 3/005 415/4.2 |
| 2018/0017038 A1 | * | 1/2018 | Cimatti ..................... | F03D 1/06 |
| 2018/0252203 A1 | * | 9/2018 | Ehrnberg ................ | F03D 80/00 |

* cited by examiner

*Primary Examiner* — William V Gilbert

(57) ABSTRACT

Omni M-VAWT is built upon and modified from Original M-VAWT to be omni directional to wind. Original M-VAWT, or Original Multi Axes-Vertical Axis Wind Turbine, is documented in U.S. Pat. No. 10,473,087 Patent granted on Nov. 12, 2019. Omni M-VAWT has significant improvements on power generation performances by having a new planet airfoil rotation and alignment assembly, a modified airfoil assembly, and the removal of Original M-VAWT mechanisms for orienting and pointing its planet airfoils persistently forward facing toward the wind. The new planet airfoil rotation and alignment assembly rotates planet airfoils fully extended and folded in rotations around their planet rotating shafts, either passively or actively within rotation limits. A modified airfoil assembly has particular modifications to shapes and sizes and rotation centers for paired planet and sun airfoils. Omni M-VAWT remains environmentally friendly to flying birds.

1 Claim, 8 Drawing Sheets

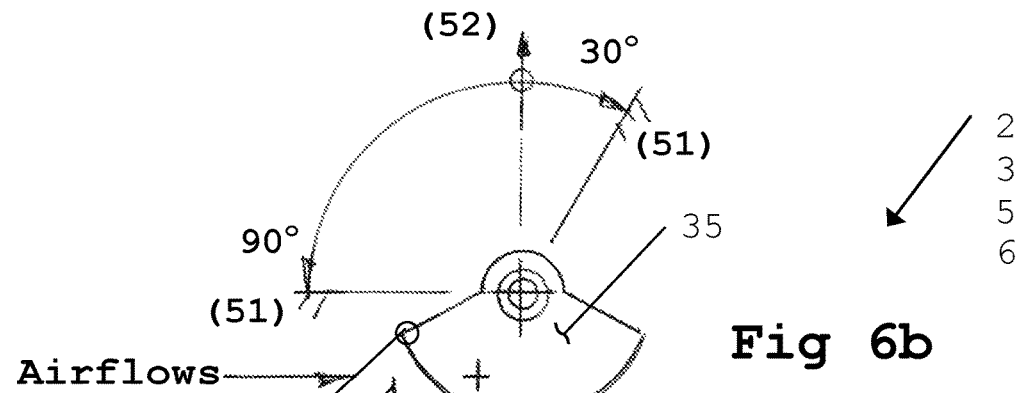
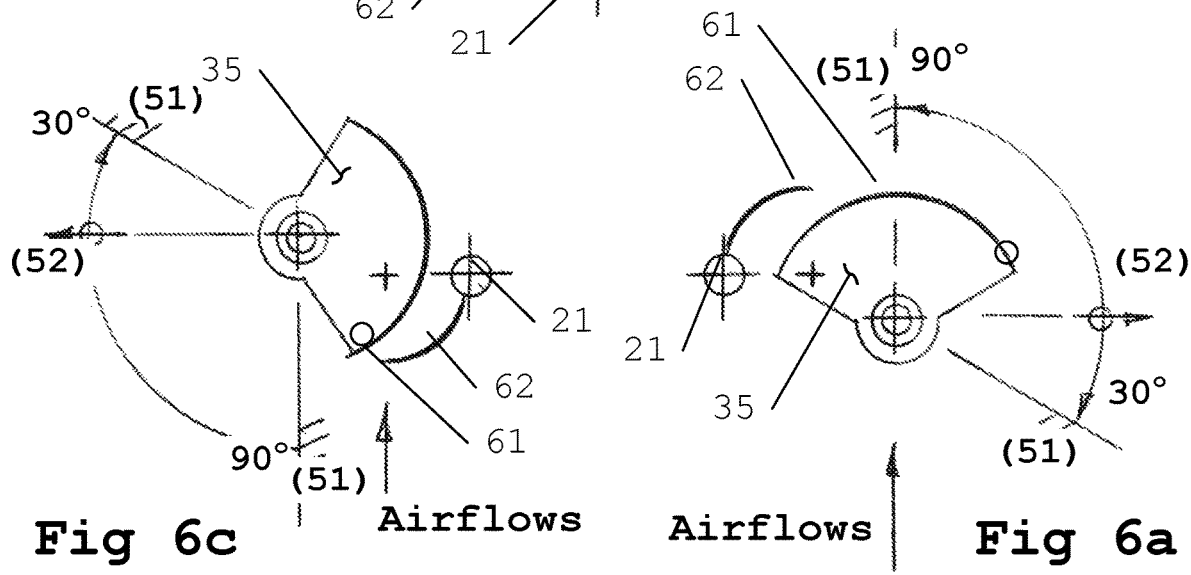
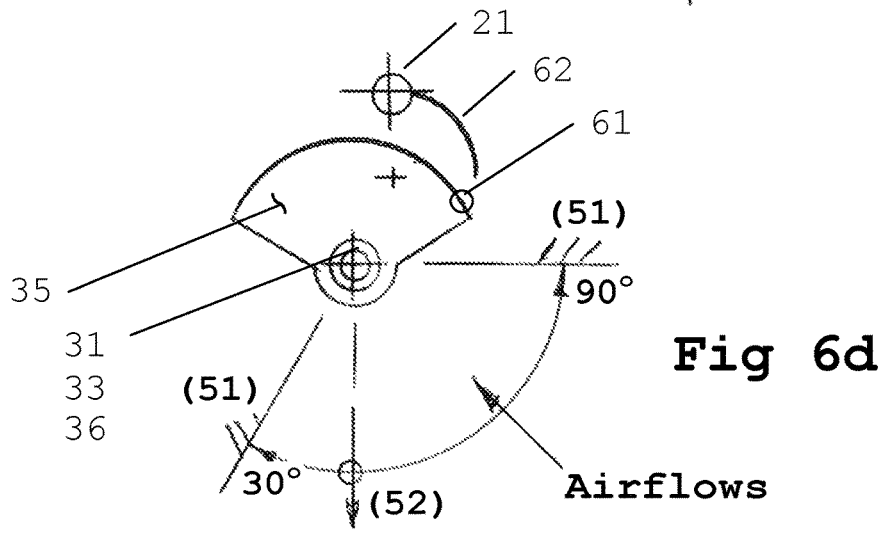
Fig 6b
Fig 6c
Fig 6a
Fig 6d

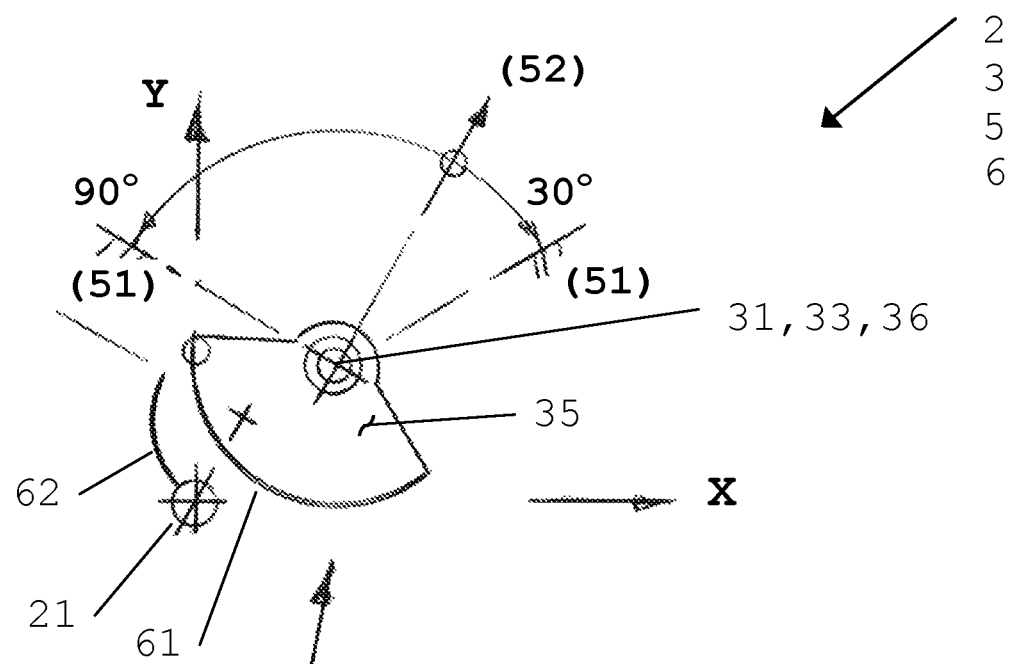
Fig 6e1
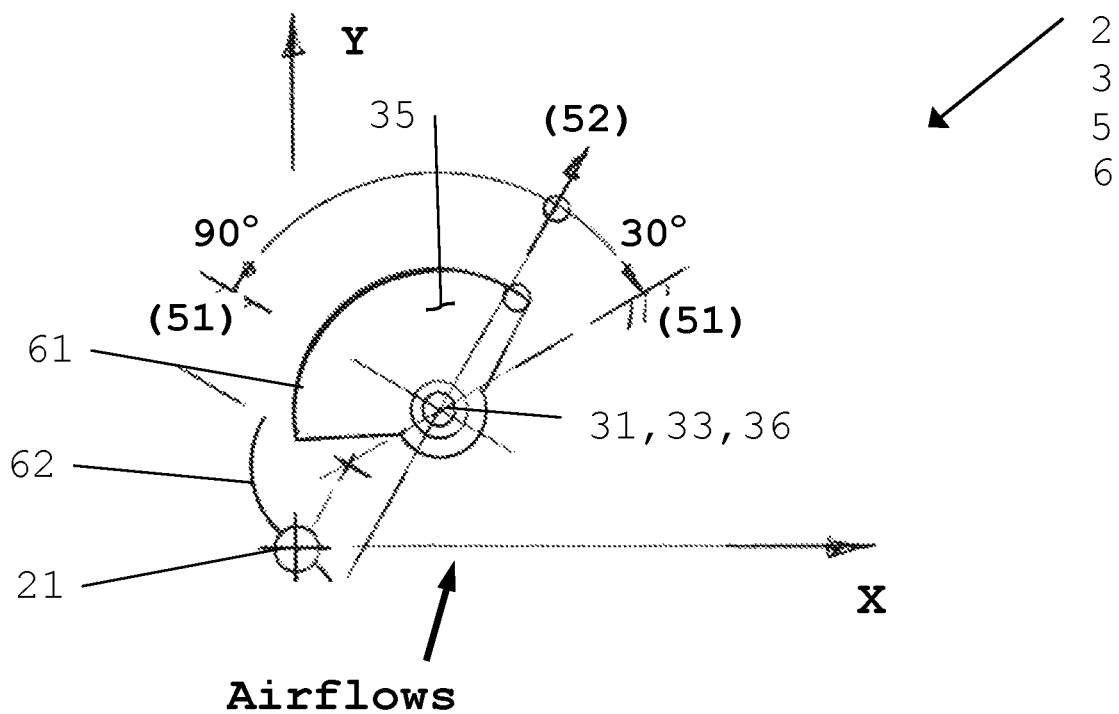
Fig 6e2

OMNI MULTI AXES-VERTICAL AXIS WIND TURBINE (M-VAWT)

FIELD

The present invention relates generally to Vertical Axis Wind Turbines (VAWTs), and more particularly, the present invention relates to M-VAWTs, or Multiple axes-VAWTs, having multiple rotating planet rotors and paired sun and planet airfoils rotating around a stationary sun rotor.

BACKGROUND OF THE INVENTION

Original M-VAWT, or Original Multiple axes-Vertical Axis Wind Turbine, disclosed and documented in U.S. Pat. No. 10,473,087 granted on Nov. 12, 2019, made important trade-offs for improved wind power generating performances from a traditional Savonius VAWT by significantly adding complexities and costs, including: Having a chain drive assembly with its orientation mechanism and control system as means for orienting its planet airfoils to be persistent facing against wind; and having a wind pointing mechanism and control systems as means for pointing planet airfoils toward wind. Original M-VAWT, incorporated by reference in Omni M-VAWT, has a sun rotor with its sun airfoils similar to a traditional Savonius VAWT, and coupled to a so called Planet VAWT, consisting: multiple planet rotors and paired planet and sun airfoils rotating around a stationary sun rotor, and planet airfoils persistently pointing forward facing wind. Omni M-VAWT of the present invention modifies and significantly simplifies Original M-VAWT at a greatly reduced cost, but has kept and incorporated many features and benefits of Original M-VAWT, including: having multiple planet rotors and paired planet and sun airfoils rotating around a stationary sun rotor for improved wind power generating performances. Omni M-VAWT is simplified at greatly reduced cost, yet is better in power performances than Original M-VAWT. Another important feature and benefit shared by both Omni and Original M-VAWTs is: A planet airfoil and its tip speed is practically limited to wind speed, which is environmentally particularly friendly to flying living things such as birds.

SUMMARY OF THE INVENTION

Omni M-VAWT, or Omni Multiple axes-Vertical Axis Wind Turbine, of the present invention is modified and simplified at a substantial cost reduction, yet is better in power performances than Original M-VAWT disclosed and documented in U.S. Pat. No. 10,473,087 granted on Nov. 12, 2019. Omni M-VAWT has paired planet and sun airfoils in rotations around the sun stationary shaft, and it is omni directional to wind. Unlike Original M-VAWT, Omni M-VAWT has neither a chain drive assembly with its orientation mechanism and control system as means for orienting its planet airfoils to be persistently facing against wind, nor a wind pointing mechanism and control systems as means for pointing Original M-VAWT forward toward wind. Both Omni M-VAWT and Original M-VAWTs are comprised of the following nearly identical assemblies: a sun rotor assembly, a planet rotor assembly, and a carrier plate assembly. Both Omni and Original M-VAWT continue to have multiple planet rotors with their planet rotating shafts and paired planet and sun airfoils rotating around a sun rotor and its sun stationary shaft. These nearly identical assemblies and features documented in Original M-VAWT patent application are applicable to Omni M-VAWT, and, with minor exception, are not repeated here for Omni M-VAWT.

Omni M-VAWT also comprises an airfoils assembly that is modified from Original M-VAWT, having particular modifications to shapes and sizes and rotation centers of paired planet and sun airfoils. Paired planet and sun airfoils are curved segments in shapes similar to portions of a semi circle, with one planet airfoil nested and freely rotated within its paired sun airfoil. A sun airfoil rotates around its sun stationary shaft; and a planet airfoil rotates around its planet rotating shaft, which in turn rotates around the sun stationary shaft. A planet airfoil is shaped for a high lift and drag hybrid airfoil, having a rounded leading edge and tapered trailing edge. Rotated and aligned with its curved segment chord on a radial line from the sun stationary shaft: its rounded leading edge is furthest away radially from the sun stationary shaft; its concave surface faces forward toward wind; its curved segment chord width is close to 2× the distance between planet rotating shaft and sun stationary shaft; its equivalent radius is slightly greater than half of the segment chord width; and its equivalent curved center point, same as the planet rotating shaft, is on a center line normal to its curved segment chord, on the concave side of the planet airfoil, and below the curved segment chord. In rotations around its sun stationary shaft, a planet airfoil is either rotated in front or behind its paired sun airfoil. A sun airfoil, rotational images of one another in rotations around its sun stationary shaft, is similar in shape to a high drag airfoil. Its curved segment resembles a quarter of a circle or half of a semicircle; the equivalent or semicircle look alike chord is on a radial line from the sun stationary shaft, its equivalent center point is on or off the radial line; and a sun airfoil is the half of a semicircle look alike closer to the sun stationary shaft. Rotations of a sun airfoil are in accordance to rotations of its semicircle lookalike chord. Sun airfoils in rotations are very much like a traditional Savonius VAWT.

Omni M-VAWT, modified from Original M-VAWT, is further comprised of a rotation and alignment assembly, consisted of rotation limit stops and a rotation and alignment mechanism. Rotation limit stops have built-in dampers and shock absorbers for setting rotation limits to a planet airfoil in rotations around its planet rotating shaft, and for reducing excessive rotation oscillations and shocks. Angle of Rotations, counter clockwise and clockwise, for a planet airfoil is measured by a measurement radial line from the sun stationary shaft inline to a forward facing planet airfoil chord, the measurement radial line rotates with the planet airfoil around sun stationary shaft, and Angle of Rotations is measured from the measurement radial line to the rotated planet airfoil chord. Maximum Angle of Rotations, counter clockwise and clockwise, are rotation limits set by rotation limit stops. A planet airfoil is fully extended or fully folded at 0.0 degrees Angle of Rotations; it is fully folded at the maximum Angle of Rotations, counter clockwise and clockwise. Rotation and alignment mechanism, as needed, provides means to actively rotate and control a planet airfoil Angle of Rotations within rotation limits set by rotation limit stop.

Omni M-VAWT, same as Original M-VAWT, has means to convert wind power to mechanical or electrical power through provisions such as power generators and control systems. Omni M-VAWT also has a rotation and alignment assembly as means to actively or passively control Angle of Rotations of a planet airfoil around its planet rotating shaft. These and other means and provisions required for Omni M-VAWT are neither novel nor unique to the present invention, and are not further described.

In operation, Omni M-VAWT is subjected to applied wind, setting it in motions, rotating counter clockwise. It is forward facing in −Y direction toward wind flowing in +Y direction, with Y axis passing through the sun stationary shaft. In viewing Omni M-VAWT in a plan view, +Y axis is pointing up and +X axis is pointing to the right. Omni M-VAWT in rotational motions, subjected to applied wind, produces airflows by rotations and other induced forces, such as inertia, centripetal, and frictions. Forces from airflows by wind are pressure forces from airflows by wind, same as pressure forces by applied wind; and forces from airflows by rotations are pressure forces from airflows by rotations. Forces from airflows by wind and rotations are combined forces from airflows by wind and forces from airflows by rotations, and are interchangeably used as airflows by wind and rotations. Airflows by wind and rotations are the dominant forces in operations of Omni M-VAWT; and all other forces are secondary forces and are ignored for the operation of Omni M-VAWT.

A planet airfoil, subjected to airflows by wind and rotations centrally applied on its planet rotating shaft, is rotated to an Angle of Rotation, given enough time, until airflows by wind and rotations are in alignment to a line from its planet rotating shaft to the planet airfoil midpoint, but no more than maximum Angle of Rotations. For airflows by wind and rotations that are offset to the right and left of a planet rotating shaft, a planet airfoil is rotated, given enough time, until reaching maximum Angle of Rotations, counter clockwise and clockwise, respectively. A planet airfoil in rotations is in response to airflows by wind and rotations centered or offset from its planet rotating shaft; and rotation limit stops with built-in dampers and shock absorbers, properly tuned and given enough time to be practical, are capable of passively minimizing the planet airfoil from excessive rotation oscillations in reaching its Angle of Rotations. If properly tuned and given enough time is not practical, optional rotation and alignment mechanism, in addition to rotation limit stops, provides the means to actively rotate and align the planet airfoil Angle of Rotations, and minimizing its rotation oscillations.

A planet airfoil, rotated to +X axis, has its concave surface fully exposed to airflows by wind and rotations; and it is fully extended with Angle of Rotations rotated to 0 degrees, because airflows by wind and rotations are generally centrally applied without offsets to the planet airfoil and its planet rotating shaft. As a planet airfoil is further rotated counter clockwise toward +Y axis, its planet airfoil inner portion is shielded from airflows by wind and rotations by its paired sun airfoil and by other paired planet and sun airfoils. Its Angle of Rotations reaches maximum clockwise prior to the airflows are offset to the right of its planet rotating shaft. After the airflows are offset to the right, the planet airfoil is fully folded with Angle of Rotations rotated to maximum counter clockwise. Rotated counter clockwise to +Y axis, a planet airfoil remains fully folded with Angle of Rotations rotated to maximum counter clockwise. The planet airfoil is mostly shielded by its paired and other sun airfoils from airflows by wind and rotations, and the airflows are offset below its planet rotating shaft. Continuing counter clockwise rotations to −X axis from +Y axis, a planet airfoil continues to be fully folded with Angle of Rotations rotated to maximum counter clockwise. A planet airfoil is mostly shielded by its paired sun airfoil from airflows by wind and rotations flowing in +Y direction; airflows by wind and rotations are offset to the right of its planet rotating shaft, and directed at the planet airfoil at a small angle of attack; and small angle of attack airflows generate little lift forces. A planet airfoil rotating toward −Y axis is increasingly exposed to airflows by wind and rotations, and the airflows by wind and rotations are increasingly changing from offset to centrally applied relative to its planet rotating shaft. In reaching −Y axis from −X axis, a planet airfoil remains fully folded with maximum counter clockwise Angle of Rotations, its concave surface is fully exposed to airflows by wind and rotations, and airflows by wind and rotations are centrally applied relative to its planet rotating shaft. Setting airflows by wind equal to airflows by rotations result in 45 degrees angle of attack airflows, and large lift forces are produced on the planet airfoil for been a high lift and drag hybrid airfoil. As a planet airfoil continues to rotate counter clockwise toward +X axis, its airflows angles of attack increases from 45 degrees to 90 degrees with little lift forces generated, it has become a purely drag airfoil, and it is changing from been fully folded to fully extended with its Angle of Rotations decreased from maximum counter clockwise back to 0 degrees. A planet airfoil in rotations around its planet rotating shaft is rotated either actively with or passively without the use of a rotation and alignment mechanism.

Omni M-VAWT generates power from airflows by wind and rotations, and in one counter clockwise rotation it reciprocates through a power cycle to generate power and a return cycle to reduce power loss. A power cycle is all one half rotation on +X side or right side of Y axis, plus a bottom half rotation on −X side or left side of Y axis. For a power cycle, paired planet and sun airfoils are rotated 270 degrees counter clockwise from −X axis to +Y axis. In a power cycle, a planet airfoil is mostly fully exposed to airflows by wind and rotations. In portions of a power cycle from −X axis to +X axis on either sides of −Y axis, a planet airfoil, for been a high lift and drag hybrid airfoil, recovers lift forces from airflows by wind and rotations to rotate it around the sun stationary shaft to generate additional power. A return cycle is the remaining top half rotation on −X side or left side of Y axis. For a return cycle, paired planet and sun airfoils are rotated 90 degrees counter clockwise from +Y axis to −X axis, where a planet airfoil is fully folded with Angle of Rotations rotated to maximum counter clockwise, and it is mostly shielded by its own paired sun airfoil from airflows by wind and rotations.

Omni M-VAWT power generating performances are dependent on paired planet and sun airfoils in rotations around the sun stationary shaft through power and return cycles. Paired planet and sun airfoils power generating performances are functions of toque, which is loads X (or multiplied by) bending moment arms. A planet airfoil, in comparisons to a sun airfoil, is substantially larger in size for much higher loads, rotates on the outer side for much longer bending moment arms, and much higher loads and bending moment arms results in much higher torques and much higher power generated. Omni M-VAWT power generating performances is reasonably represented by a planet airfoil rotating through power and return cycles.

In one rotation, peak powers generated and lost for a planet airfoil is when it is rotated through power and return cycles to +X and −X axis, respectively, and subjected to no lift forces. A planet airfoil in a power cycle also generate powers by lift force from airflows by wind and rotations, especially when it is rotating from −X axis to +X axis on either sides of −Y axis. For peak powers generated in a power cycle, a planet airfoil at +X axis is fully extended with 0 degrees Angle of Rotations; it is subjected to large forces by having its concave surface predominately facing forward and fully exposed to airflows by wind and rotations in front of its paired sun airfoil; its bending moment arms is long; and its peak powers generated is large (large force X long arm). For peak powers lost in a return cycle, a planet airfoil at −X axis is fully folded with Angle of Rotations rotated to maximum counter clockwise; it is subjected to small forces by been predominately fully shield behind its paired sun airfoil from airflows by wind and rotations; its bending moment arm is short; and its peak powers lost is small (small force X short arm). In one rotation, large peak power generated in a power cycle (large force X long arm) is substantially more than small peak power lost in a return cycle (small force X short arm); and a 270 degrees power cycle is substantially longer than a 90 degrees return cycle. Peak power performances of a planet airfoil through power and return cycles are indicative and reasonably represent power performances for one rotation through entire power and return cycles. Omni M-VAWT generates substantially more powers in a power cycle at substantially longer time duration than powers lost in a return cycle at much shorter time duration.

Omni M-VAWT, aside from power generating performances, is friendly to flying living things for having a planet airfoil tip speed less than the wind speed. A planet airfoil rotated to the right on +X axis in a power cycle is at outer most edge of rotating Omni M-VAWT, fully extended, and fully exposed to wind. A planet airfoil and its leading edge rotating near either side of +X axis are generally rotating at constant speed, because a planet airfoil maintains the same rotational orientation facing the wind. In a freely spinning Omni M-VAWT, not generating power, the maximum speed for the planet airfoil, same as for its tips, is limited by the speed of wind. A planet airfoil tip speed below the wind speed is particularly environmentally friendly to flying living things such as birds.

In summary, Omni M-VAWT, modified from Original M-VAWT, has greatly reduced its complexities and costs, and yet generating more power. Unlike Original M-VAWT, Omni M-VAWT is omni directional to wind, and has neither a chain drive assembly with its orientation mechanism and control system, nor a wind pointing mechanism and its control system. Paired planet and sun airfoils are effective in recovery of wind power by their interactions in rotations around their sun stationary shaft through power and return cycles. Omni M-VAWT has further improved power performances by modifying a planet airfoil into a high lift and drag hybrid planet airfoil for recovery of wind power through airflows induced lift forces, by fully folding a planet airfoil behind its paired sun airfoil in return cycles, and by lengthening power cycles and shortening return cycles. Both Omni and Original M-VAWTs have another important feature and benefit, where: A planet airfoil speed and its tip speed are practically the same and limited to wind speed to be particularly environmentally friendly to flying living things such as birds.

BRIEF DESCRIPTION OF THE DRAWINGS

FIGS. 6a,b,c, and d are schematic plan views of paired planet and sun airfoils shown on the right side in FIG. 4 subjected to applied wind to rotate counter clockwise in 90 degrees increment from +X axis to +Y axis to −X axis, and to −Y axis, respectively, and back to +X axis.

FIGS. 6e1 and e2 are schematic plan views of paired planet and sun airfoils subjected to applied wind to rotate counter clockwise 60 degrees from +X axis, rotating in transitions from paired planet and sun airfoils shown at +X axis in FIG. 6a to +Y axis in FIG. 6b, respectively.

DESCRIPTION OF THE PREFERRED EMBODIMENT

Figure 1:
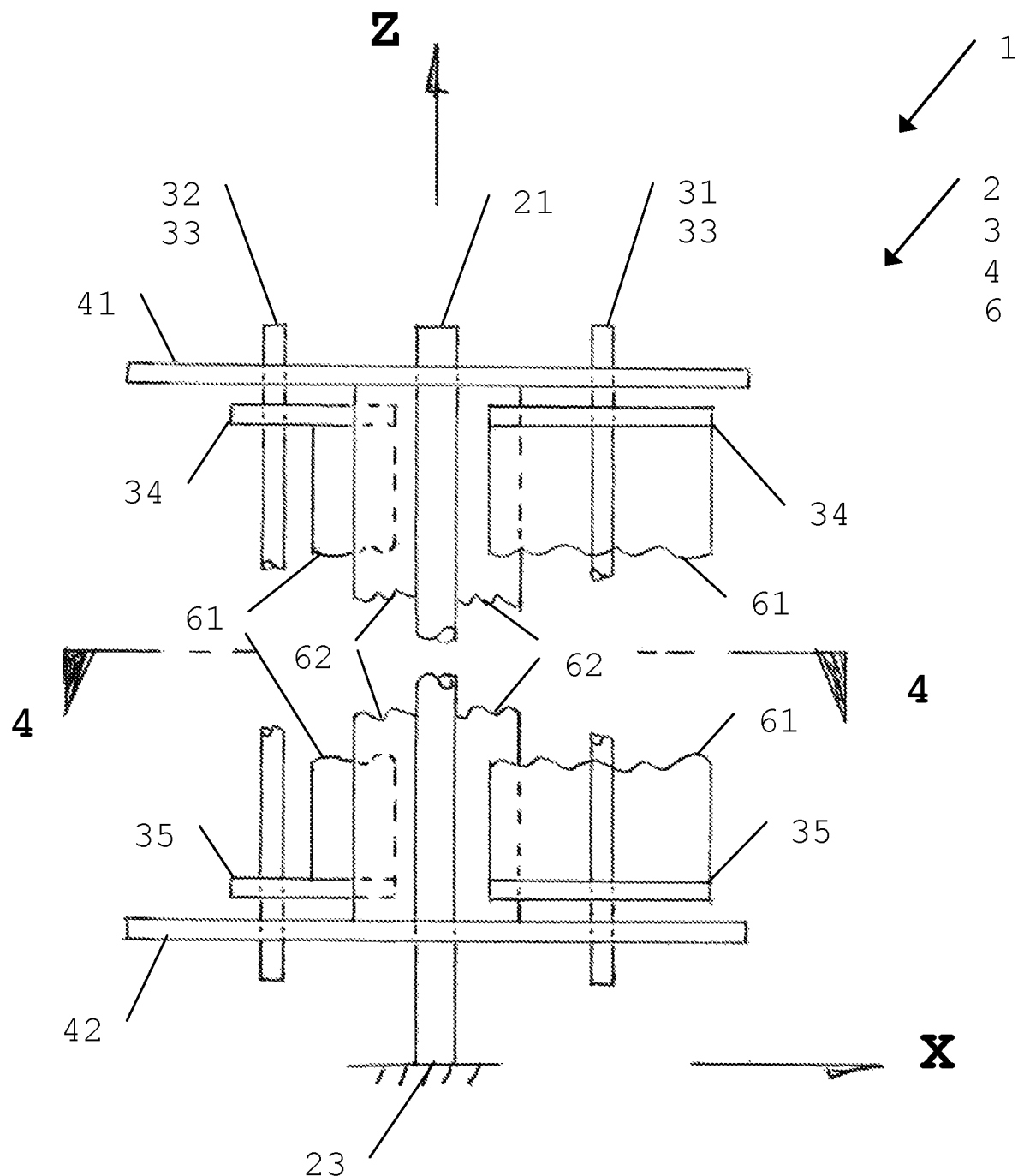
FIG. 1 is an elevation view of the preferred embodiment of the present invention.
Figure 2:
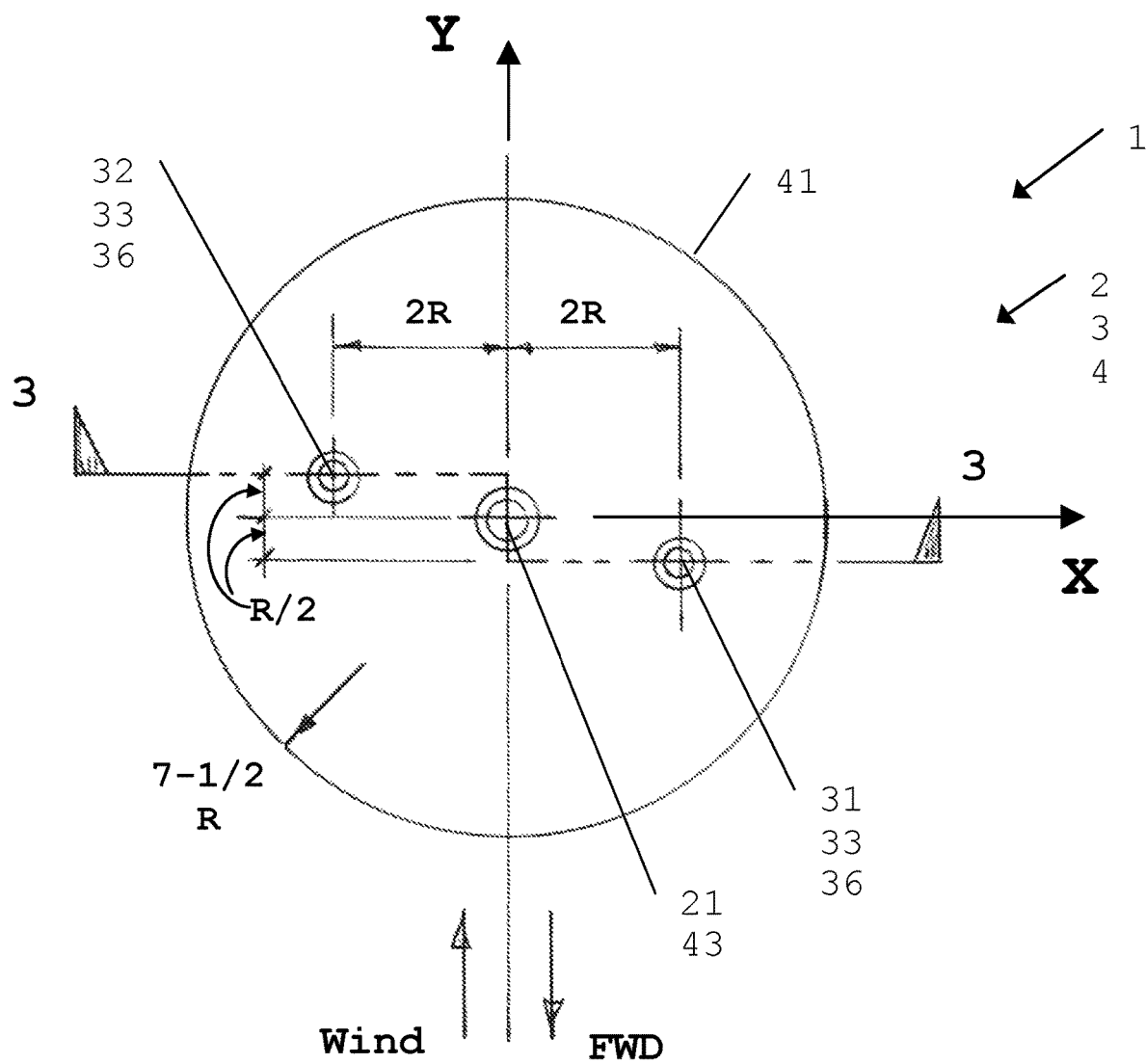
FIG. 2 is a top view of the preferred embodiment of the present invention.
Figure 3:
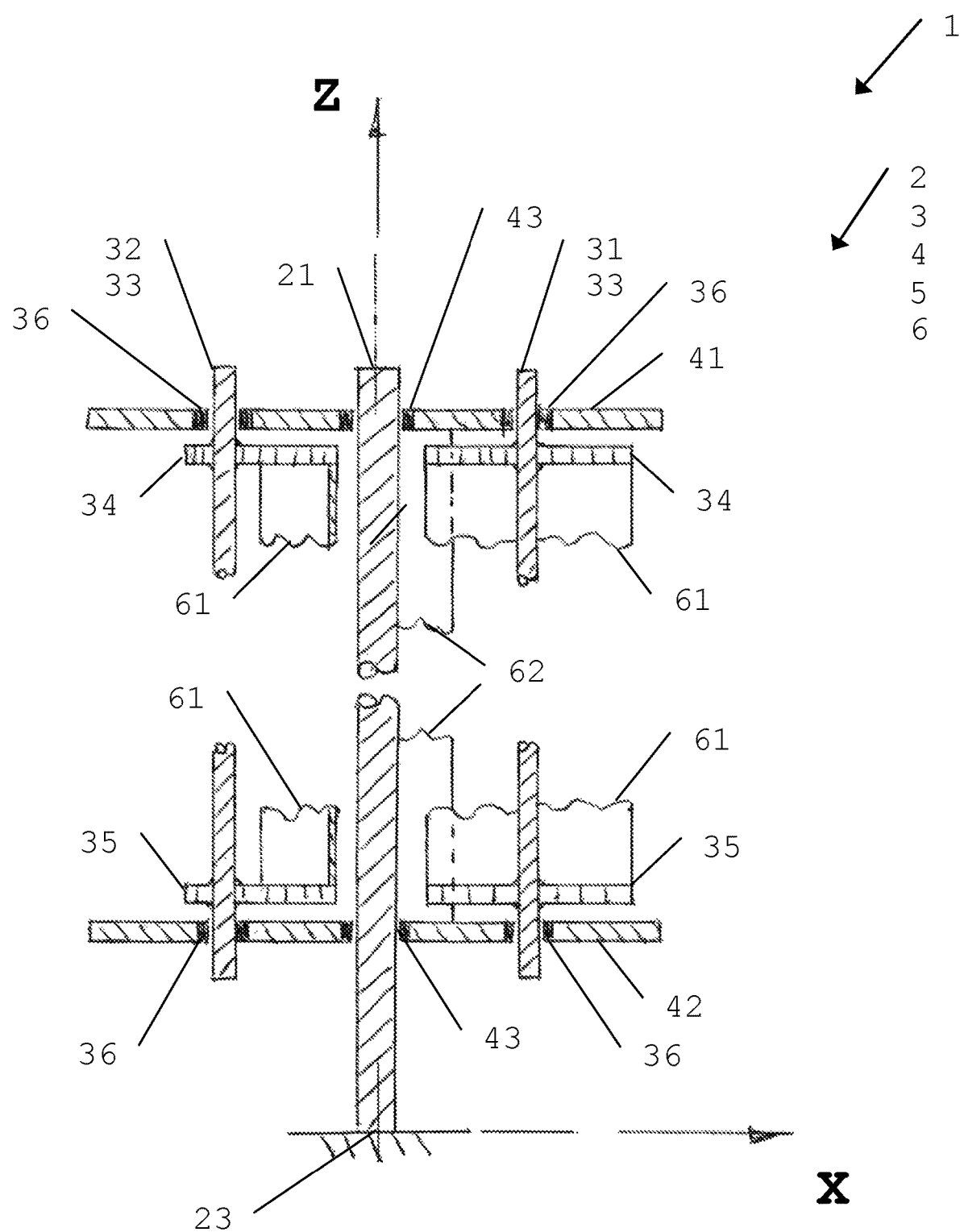
FIG. 3 is a cross section view of the preferred embodiment of the present invention taken along line 3-3 shown in FIG. 2.

Omni M-VAWT, or Omni Multiple axes-Vertical Axis Wind Turbine, of the present invention is disclosed by a preferred embodiment, which is a simplified Omni M-VAWT to show with clarity its features and advantages for converting wind power to mechanical and electrical powers. These and other features and advantages of the present invention will become more apparent to one skilled in the art from the following description and claims when read in light of the accompanying drawings for the preferred embodiment of a simplified present invention.

Unless otherwise apparent, or stated, directional references, such as "inner," "inward," "outer," "outward," "downward," "upper", "lower" etc., are for non-limiting descriptive purposes and intended to be relative to the orientation of a particular Omni M-VAWT of the present invention as shown in the view of that apparatus. Parts shown in a given FIGURE are generally proportional in their dimensions.

Referring to FIGS. 1 thru 4, preferred embodiment 1 of Omni M-VAWT of the present invention comprises: sun rotor assembly 2, planet rotor assembly 3, carrier plate assembly 4, rotation and alignment assembly 5, and airfoils assembly 6. Preferred embodiment 1 has an X-Y-Z coordinate system centered at sun rotor base support 22, +Z axis points up along sun stationary shaft 21, +X axis points to the right, and +Y axis is in alignment with applied wind. Preferred embodiment 1 is forward facing in −Y direction and rotates counter clockwise against applied wind, and planet rotors 31 and 32 are shown rotated to the right on (+) X axis and left on (−) X axis, respectively.

Sun rotor assembly 2 is stationary, and is consisted of sun stationary shaft 21 and its base support 22. Planet rotor assembly 3, rotating around sun rotor assembly 2, is consisted of planet rotors 31 and 32, each of which has planet rotating shaft 33 supported at two ends by cap and base plate 34 and 35 through planet bearings 36. Planet rotors 31 and 32 are rotational images and spaced equally at 180 degrees apart. Shown in particular in FIG. 4, planet rotor 31 in rotations is rotated to the right on +X axis, and its planet rotating shaft 33 is located at X=2.0 R and Y=−0.5 R, a 0.5R offset below +X axis. Planet rotor 32, been a rotational image of planet rotor 31, is rotated to the left on −X axis, its planet rotating shaft 33 is located at X=−2.0 R and Y=+0.5 R, a 0.5R offset above −X axis. Dimensions are in reference to 1.0R as the radius for a sun airfoil. Carrier plate assembly 4 is consisted of top and bottom carrier plates 41 and 42, and each of which has center mounted bearing 43. Carrier plate assembly 4, with mounted planet rotor assembly 3 through bearing 36, rotates around and is supported by sun stationary shaft 21 through bearings 43.

Figure 4:
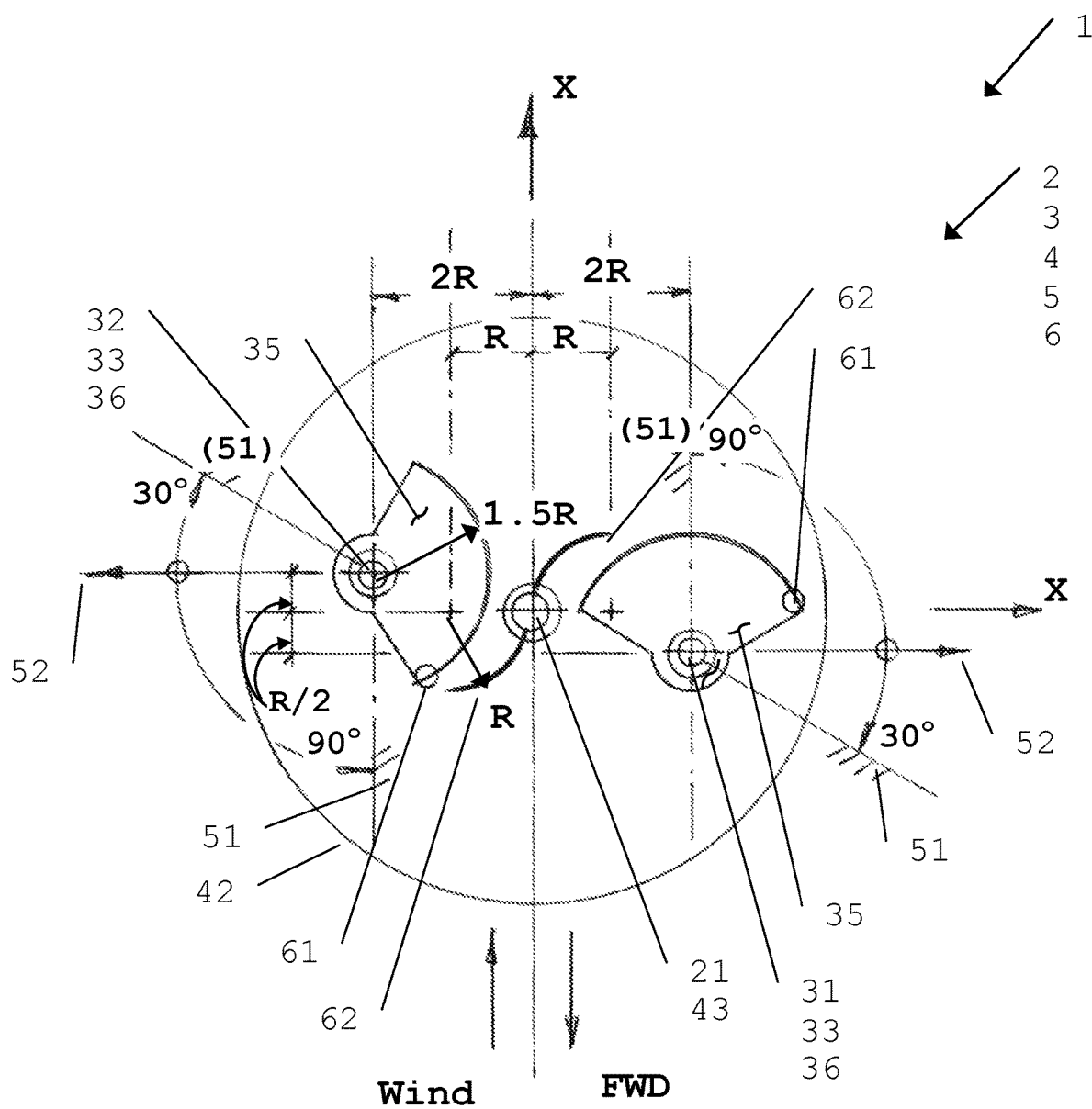
FIG. 4 is a cross section view of the preferred embodiment of the present invention taken along line 4-4 shown also in FIG. 1.

Continue referring to FIG. 4, rotation and alignment assembly 5 is consisted of rotation limit stop 51 and rotation and alignment mechanism 53. Rotation limit stop 51 has built-in dampers and shock absorbers for setting rotation limits, counter clockwise and clockwise, for planet airfoil 61 in rotations around its planet rotating shaft 33. Rotation limit stop 51 is also used for reducing excessive planet airfoil 61 rotation oscillations. Angle of Rotations, counter clockwise and clockwise, for planet airfoil 61 is measured by a measurement radial line 52 from sun stationary shaft 21 that is parallel to planet airfoils 61 chord rotated parallel; and the angle from the measurement radial line 52 to rotated planet airfoil 61 chord is Angle of Rotations. Planet airfoil 61 maximum Angle of Rotations, counter clockwise and clockwise, are 90 degrees and 30 degrees, respectively, set by rotation limit stop 51. Planet airfoil 61 is fully extended at 0.0 degrees Angle of Rotations; and it is fully folded, counter clockwise and clockwise, at maximum Angle of Rotations of 90 degrees counterclockwise and 30 degrees clockwise, respectively. Planet airfoil 61 of planet rotor 31 has 0.0 degrees Angle of Rotations, and is fully extended; and Planet airfoil 61 of planet rotor 32 has maximum 90 degrees counter clockwise Angle of Rotations, and is fully folded. Rotation and alignment mechanism 53, as needed, provides means to actively rotate and control planet airfoil 61 Angle of Rotations and rotation oscillations.

Airfoils assembly 6 is consisted of paired planet airfoils 61 and sun airfoils 62 in rotations around sun stationary shaft 21. Planet airfoil 61 is fixed mounted at top and bottom to cap and base plates 34 and 35, and it rotates around planet rotating shaft 33 of planet rotors 31 and 32, which are rotated by top and bottom carrier plates 41 and 42 around sun stationary shaft 21. Sun airfoil 62 is fix mounted at top and bottom to top and bottom carrier plates 41 and 42, respectively. Paired planet airfoil 61 and sun airfoil 62, mounted indirectly or directly to top and bottom carrier plates 41 and 42, rotates at the same rate around sun stationary shaft 21.

Paired planet and sun airfoils 61 and 62 are circular curved segments of circles. Planet airfoil 61 is a circular curved segment of a circle 1.5 R in radius centered at its planet rotating shaft 33. It is a shaped for a high lift and drag hybrid airfoil, having a rounded leading edge and tapered trailing edge. Planet airfoil 61 of planet rotor 31 is rotated to the right on +X axis, and is orientated as follows: its circular curved segment chord is inline on +X axis; its circular curved segment center point is on its planet rotating shaft 33 located at 0.5 R offset below X axis; its rounded leading edge is furthest away radially from sun stationary shaft 21; its concave surface faces forward toward wind; and it is fully extended with 0.0 degrees Angle of Rotations. Planet airfoil 61 of planet rotor 32 is rotated to the left on −X axis; and it is fully folded counter clockwise with maximum 90 degrees counter clockwise Angle of Rotations. Sun airfoil 62 is quarter of a circle or half of a semicircle with radius 1.0 R, and nested within it is its paired planet 61. Sun airfoil 62, paired to planet airfoils 61 of planet rotor 31, is oriented, where: its semicircle chord is on +X axis centered at X=+1.0 R; its semicircle concave surface faces wind; and it is the left half of semi circle above +X axis. Sun airfoil 62 is a circular curved segment in the shape of a high drag airfoil, and it rotates in accordance to rotations of its semicircle segment and chord around sun stationary shaft 21. Sun airfoil 62 in rotations is very much like a traditional Savonius VAWT.

Preferred embodiment 1 has means to convert wind power to mechanical or electrical power through provisions such as power generators and control systems. It also has rotation and alignment assembly 5 as means to actively or passively control planet airfoil 61 Angle of Rotations. These and other means and provisions required for preferred embodiment 1 are neither novel nor unique, and are not further described.

Figure 5:
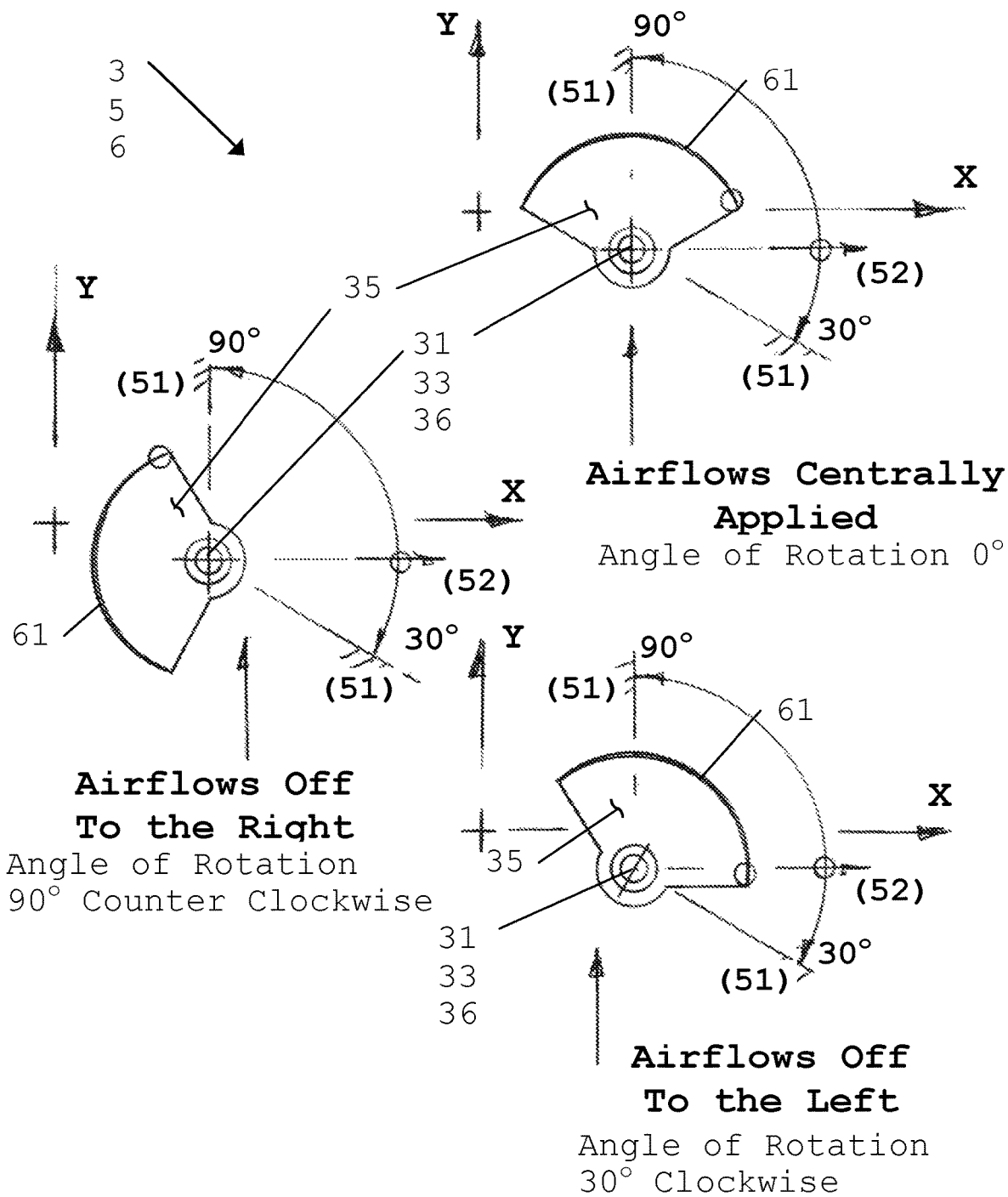
FIG. 5 is a composite schematic plan view of planet airfoil shown on the right in FIG. 4 rotated to 3 orientations with applied wind centered, and offset to the left, and right.
Figure 7:
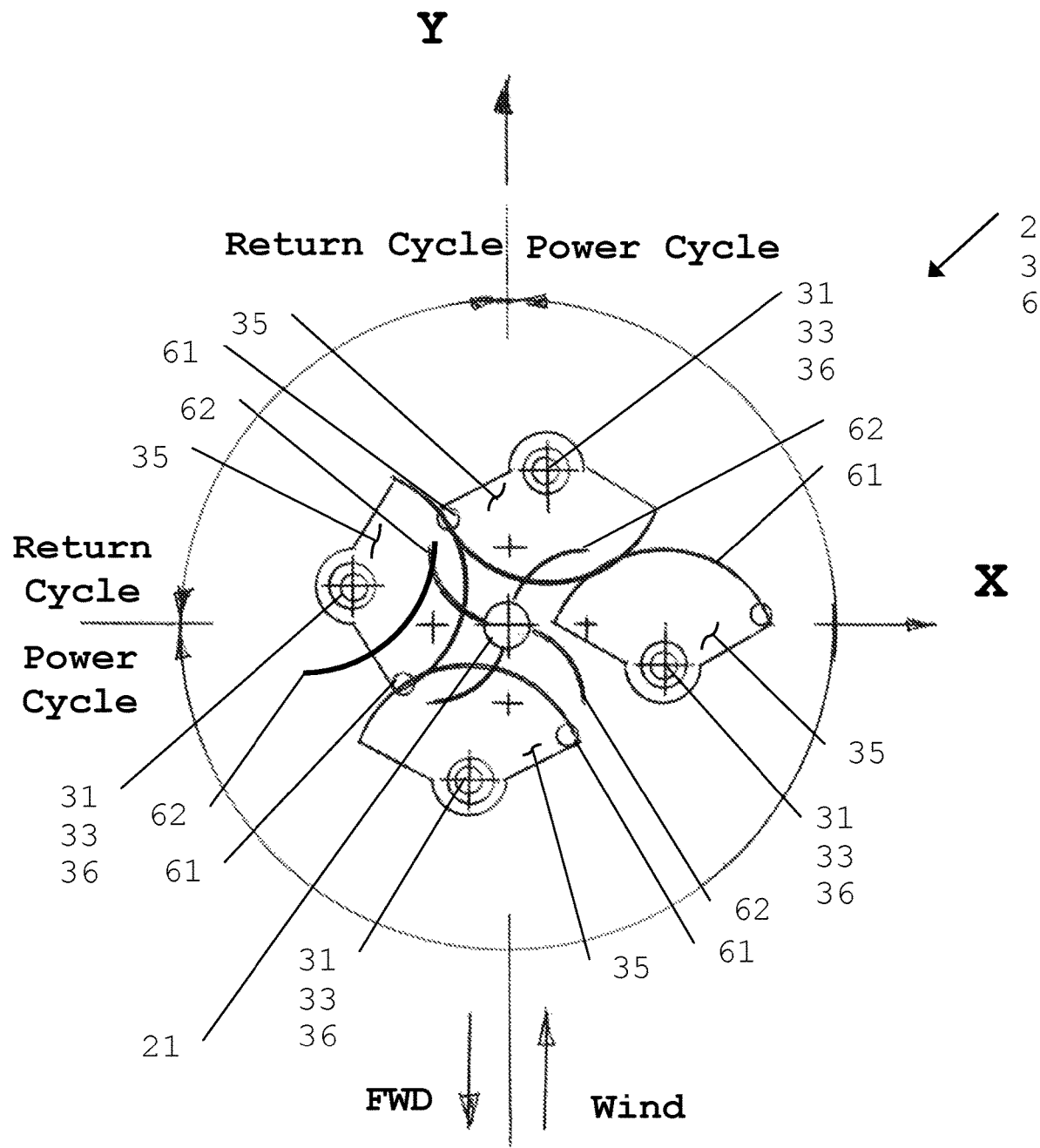
FIG. 7 is a schematic composite plan view of paired planet and sun airfoils shown in FIGS. 6a, c, d, and e subjected to applied wind in one counter clockwise rotation around the stationary sun shaft at 90 degree angle increments.

In operation, and referring to FIGS. 5, 6, and 7, preferred embodiment 1 of Omni M-VAWT of the present invention, subjected to applied wind, is set in motions. Paired planet and sun airfoils 61 and 62 and planet rotors 31 and 32 rotate counter clockwise around sun stationary shaft 21. Setting preferred embodiment 1 in rotations produces airflows by rotations and other induced forces, such as inertia, centripetal, and frictions. Forces from airflows by wind are applied wind pressure forces, and forces from airflows by rotations are pressure forces from airflows by rotations. Forces from airflows by wind and rotations are interchangeable used as airflows by wind and rotations. Airflows by wind and rotations are the dominant forces in operations of preferred embodiment 1; and all other forces are secondary forces and are ignored for the operation of preferred embodiment 1.

Shown in particular in FIG. 5 is a composite of 3 rotated views of planet airfoil 61 of planet rotor 31 on +X axis. Subjected to airflows by wind and rotations in the directions shown, planet airfoil 61 is rotated to Angle of Rotations of 0 degrees, 90 degrees maximum counter clockwise, and 30 degrees maximum clockwise. Angle of Rotations in between 90 degrees maximum counter clockwise and 30 degrees maximum clockwise are limited by rotation limit stops 51 with built-in damper and shock absorber. For airflows by wind and rotations that are centered on planet rotating shaft 33, planet airfoil 61 is rotated to an Angle of Rotations, given enough time, until forces from airflows by wind and rotations are in alignment to a line from its planet rotating shaft 33 to planet airfoil 61 midpoint, or until planet airfoil 61 reaches maximum Angle of Rotations, counter clockwise and clockwise. For airflows by wind and rotations that are offset to the right and left of planet rotating shaft 33, planet airfoil 61 is rotated, given enough time, until reaching maximum Angle of Rotations, counter clockwise and clockwise, respectively. Planet airfoil 61 in rotations is in response to airflows by wind and rotations centered or offset from planet rotating shaft 33; and rotation limit stops 51 with built-in dampers and shock absorbers, properly tuned and given enough time to be practical, are capable of passively minimizing planet airfoil 61 from excessive rotation oscillations in reaching its Angle of Rotations. If properly tuned and given enough time is not practical, optional rotation and alignment mechanism 53, in addition to rotation limit stops 51, provides the means to actively rotate and align planet airfoil 61 Angle of Rotations, and minimizing its rotation oscillations.

Shown in particular in FIG. 6a, b, c, d, and e1 and e2, planet airfoil 61 of planet rotor 31, subjected to airflows by wind and rotations, is rotate counter clockwise in one rotation from +X axis back to +X axis. Planet airfoil 61 of planet rotor 31 is shown in FIGS. 6a,b,c, and d, subjected to applied wind, rotating counter clockwise in 90 degrees increment from +X axis to +Y axis to −X axis, and to −Y axis, respectively, and back to +X axis shown in FIG. 6a. Planet airfoil 61 of planet rotor 31 is shown in FIGS. 6e1 and e2, subjected to applied wind, rotating counter clockwise 60 degrees from +X axis, rotating in transitions for planet airfoil 61 from +X axis shown in FIG. 6a to +Y axis shown in FIG. 6b, respectively.

Rotated to +X axis shown in FIG. 6a, planet airfoil 61 of planet rotor 31 is fully extended with 0 degrees Angle of Rotations. Airflows by wind and rotations are generally centrally applied without offsets to planet airfoil 61 and its planet rotating shaft 33. Shown in FIG. 6b, planet airfoil 61 of planet rotor 31 is further rotated counter clockwise to +Y axis from +X axis. Planet airfoil 61 is fully folded with maximum 90 degrees counter clockwise Angle of Rotations. It is mostly shielded by sun airfoils 62 of both planet rotors 31 and 32 from airflows by wind and rotations that are offset below planet rotating shaft 33. Shown in FIG. 6c, planet airfoil 61 of planet rotor 31 is rotated counter clockwise to −X axis from +Y axis, and continues to be fully folded with maximum 90 degrees counter clockwise Angle of Rotations. Planet airfoil 61 is mostly shielded by its paired sun airfoil 62 from combined airflows by wind rotations, flowing up along +Y axis, and offset to the right of planet rotating shaft 33. Airflows by wind and rotations has 0 degrees angle of attack to generate little lift forces planet airfoil 61. Shown in FIG. 6d, planet airfoil 61 of planet rotor 31 has reached −Y axis from −X axis, and it continued to be fully folded with maximum 90 degrees counter clockwise Angle of Rotations. In rotations toward −Y axis, planet airfoil 61 is increasingly exposed to airflows by wind and rotations, and the airflows by wind and rotations are increasingly changing from offset to centrally applied relative to planet rotating shaft 33. Upon reaching −Y axis, and setting airflows by wind equal to airflows by rotations, planet airfoil 61 has 45 degrees angle of attack airflows by wind and rotations, and large lift forces. As planet airfoil 61 of planet rotor 31 continues to rotate counter clockwise toward +X axis shown in FIG. 6a; its airflows angles of attack increases from 45 degrees to 90 degrees; its Angle of Rotations decreases back to 0 degrees as it is changed from been fully folded to fully extended; lift forces are reduced to 0; and it becomes a purely a drag airfoil. Planet airfoil 61 in rotations around its planet rotating shaft 33 is rotated either actively with or passively without the use of rotation and alignment mechanism 53.

Planet airfoil 61 of planet rotor 31 is shown in FIGS. 6e1 and e2, subjected to applied wind, to rotate counter clockwise 60 degrees from +X axis, rotating in transitions for planet airfoil 61 from +X axis shown in FIG. 6a to +Y axis shown in FIG. 6b, respectively. As planet airfoil 61 approaches 60 degrees from +X axis, its inner portion is increasingly shielded from airflows by wind and rotations by its paired sun airfoil 62 and by paired planet and sun airfoils 61 and 62 of planet rotor 32. Its Angle of Rotations reaches maximum clockwise prior to the airflows are offset to the right of its planet rotating shaft 33. After the airflows by wind and rotations are offset to the right of planet rotating shaft 33, planet airfoil 61 is fully folded with Angle of Rotations rotated to maximum 90 degrees counter clockwise.

Shown in particular in FIG. 7, preferred embodiment 1 of Omni M-VAWT of present invention in operation generates power from airflows by wind and rotations. FIG. 7 is a composite views of FIGS. 6a, c, d, and e for paired planet and sun airfoils 61 and 62 of planet rotor 31 rotated counter clockwise in 90 degrees increments from +X axis to +Y axis, −X axis, and −Y axis, respectively. Preferred embodiment 1 in one counter clockwise rotation reciprocates through a power cycle to generate power and a return cycle to reduce power loss. For a power cycle, paired planet and sun airfoils 61 and 62 are rotated 270 degrees counter clockwise from −X axis to +Y axis. Planet airfoil 61 in a power cycle is mostly fully exposed to airflows by wind and rotations. In portions of a power cycle from −X axis to +X axis on either sides of −Y axis, planet airfoil 61, for been a high lift and drag hybrid airfoil, recovers lift forces from airflows by wind and rotations to rotate it around sun stationary shaft 21 for power generations. For a return cycle, paired planet and sun airfoils 61 and 62 of planet rotor 31 are rotated 90 degrees counter clockwise from +Y axis to −X axis. Airfoil 61 in a return cycle is fully folded and mostly shielded by its own paired sun airfoil 62 from airflows by wind and rotations.

Continue referring to FIG. 7, preferred embodiment 1 power generating performances are dependent on paired planet and sun airfoils 61 and 62 in rotations around sun stationary shaft 21 through power and return cycles. Paired planet and sun airfoils 61 and 62 power generating performances are functions of toque, which is loads X (or multiplied by) bending moment arms. Planet airfoil 61 in a power cycle, in comparisons to sun airfoil 62, is substantially larger in size for much higher loads, rotates on the outer side for much longer bending moment arms, and much higher loads and bending moment arms results in much higher torques and powers generated. Preferred embodiment 1 power generating performances is reasonably represented by planet airfoil 61 rotating through power and return cycles.

In a power cycle for the half of the rotation on right side of Y axis, planet airfoil 61 rotates 180 degrees counter clockwise from −Y axis to +Y axis. Planet airfoil 61 generates most power when it is rotated to +X axis and subjected to a large peak force from airflows by wind and rotations. Planet airfoil 61 is fully extended with 0 degrees Angle of Rotations, its concave surface faces forward and fully exposed to airflows by wind and rotations in front of its paired sun airfoil 62; its bending moment arms is long; and it generates large powers (large peak force X long arm). For return cycles at top portion of the half rotation on left side of Y axis, planet airfoil 61 rotates 90 degrees counter clockwise from +Y axis to −X axis. Planet airfoil has most power reduction when it is rotated to −X axis. It is subjected to a small peak force for been fully folded with 90 degrees maximum counter clockwise Angle of Rotations, and been predominately fully shield behind its paired sun airfoil 62 from airflows by wind and rotations; its bending moment arm is short; and it generates small power loss (small peak force X short arm). Also, for the portions of a power cycle from −X axis to +X axis on either sides of −Y axis, planet airfoil 61, for been a high lift and drag hybrid airfoil, recovers lift forces from airflows by wind and rotations to rotate it and its planet rotating shaft 33 around sun stationary shaft 21 for additional power generated. In one rotation, peak power generated in a power cycle (large force X long arm) is substantially more than peak power lost in a return cycle (small force X short arm); and a 270 degrees power cycle is substantially longer than a 90 degrees return cycle. Planet airfoil 61 peak power performances through power and return cycles are indicative and reasonably represent power performances for one rotation through entire power and return cycles. Preferred embodiment 1 generates substantially more power in a power cycle at substantially longer time duration than power lost in a return cycle at shorter time duration.

Preferred embodiment 1, aside from power generating performances, is friendly to flying living things by having planet airfoil 61 tip speed less than the wind speed. Planet airfoil 61 of planet rotor 31 to the right on +X axis in a power cycle is at outer most edge of rotating preferred embodiment 1, fully extended, and fully exposed to wind. Planet airfoil 61 and its leading edge rotating close to either side of +X axis are generally rotating at constant speed because planet airfoil 61 maintains the same rotations orientation facing the wind. Preferred embodiment 1, freely spinning and not generating power, has the maximum speed for planet airfoil 61, same as for its tips, limited by the speed of wind. Planet airfoil 61 tip speed is below the wind speed, and is particularly environmentally friendly to flying living things such as birds.

The preferred embodiment described above is for the purpose of describing features and technical conceptions of a simplified Omni M-VAWT of the present invention. But it should be readily apparent that the invention is not limited to the described preferred embodiment alone, and a person skilled in the art may come up with various changes and modifications consistent to the technical concept disclosed herein and within the spirit and scope of the invention. Prime examples of changes and modifications to the described preferred embodiment include: the number of planet rotors; the shapes, sizes, center points, numbers, and types (lift, drag, or hybrid) of planet and sun airfoils; planet high lift and drag hybrid airfoils assembled from segmented main body, leading edge slats, and trailing edge flaperons; optional powered planet airfoil rotation and alignment assembly; and as for Original M-VAWT, Omni M-VAWT is reversible to be a tower fan by been powered to propel wind. Omni M-VAWT maybe structurally supported at the top by guy wires or other means, and has other structural supports for stabilities and reduced vibrations. Where stated, "wind" is broadly meant to be any fluid medium, including water. Required systems such as power generators, motors, rotation limit stops with built-in dampers and shock absorbers, rotation and alignment mechanisms, and controls are neither novel nor unique systems, and are not described in detail for the preferred embodiment of the present invention. Therefore, it is to be understood that modifications and variations may be utilized without departure from the spirit and scope of the invention disclosed herein, as those skilled in the art will readily understand. Such modifications and variations are considered to be within the purview and scope of the claimed invention and their equivalents.

I claim:
1. An Omni Multi Axes-Vertical Axis Wind Turbine (M-VAWT), comprising:
a plurality of airfoil assemblies, each said airfoil assembly comprising a carrier plate assembly, a sun rotor assembly, a planet rotor assembly, and a rotation and alignment assembly, wherein:
a. said carrier plate assembly comprises a top carrier plate and a bottom carrier plate;
b. said sun rotor assembly comprises a vertically oriented sun stationary shaft having a plurality of sun airfoils of circular curved segments equally spaced around and fixed to said sun stationary shaft, said circular curved segments extending between said top carrier plate and said bottom carrier plate, said circular curved segments each having a radius defend as 1.0*R, said sun stationary shaft extending through said top carrier plate and said bottom carrier plate, and a first bearing between said sun stationary shaft and said top carrier plate and a second bearing between said sun stationary shaft and said bottom carrier plate;
c. said planet rotor assembly comprises a plurality of planet rotor shafts equally spaced circumferentially around said sun stationary shaft from a distance of 2.0*R, said planet rotor assembly further comprising for each said planet rotor shaft a cap and a base plate and a planet airfoil extending between said cap and said base plate and affixed thereto; each said planet airfoil rotating relative to said planet rotor shaft, each said planet airfoil having a shape of a circular curved segment having a radius of 1.5*R; and each said cap plate, each said base plate and each said planet airfoil extending between said top carrier plate and said bottom carrier plate, each said planet rotor shaft extending through said top carrier plate and said bottom carrier plate, and a first bearing between each said planet rotor shaft and said top carrier plate and a second bearing between each said planet rotor shaft and said bottom carrier plate; and
d. said rotation and alignment assembly comprises limit stops.

* * * * *